Patented Apr. 4, 1939

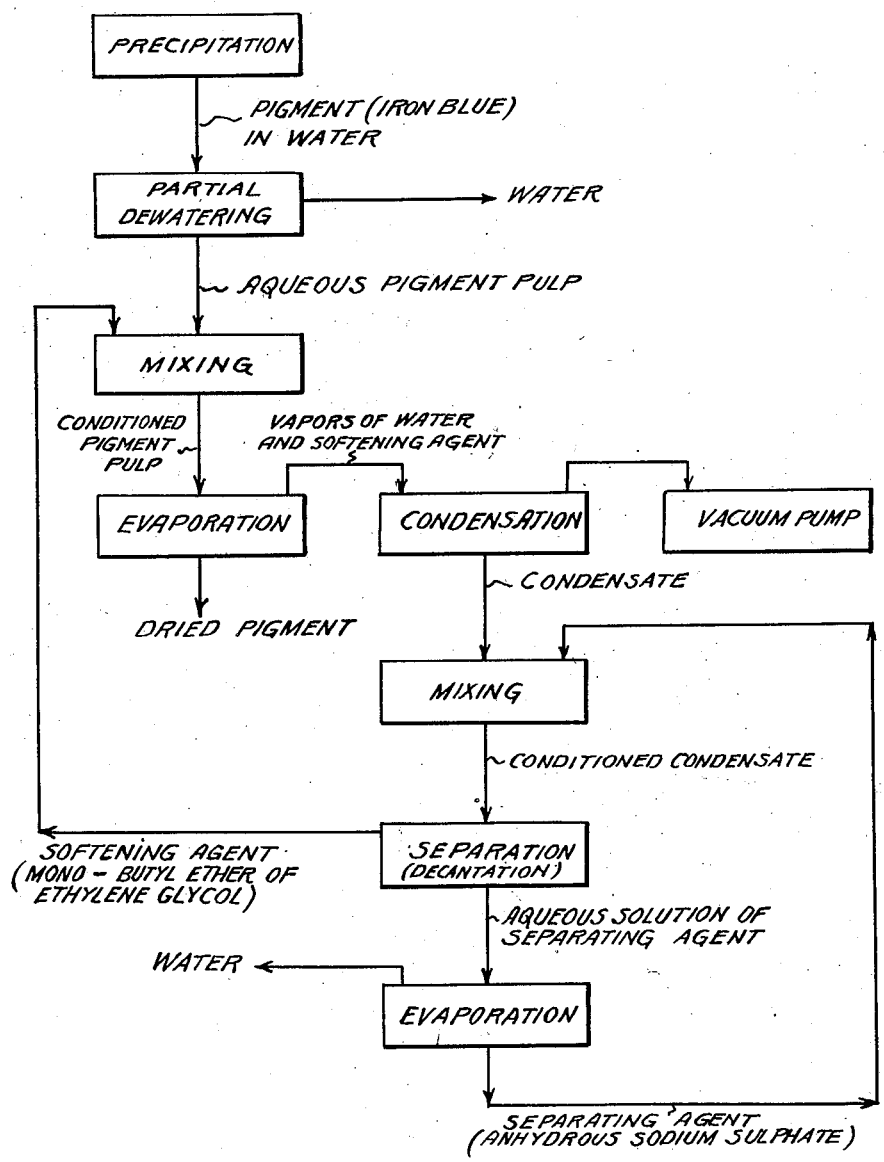

2,152,716

UNITED STATES PATENT OFFICE 2,152,716

DRYING PIGMENTS

Alfred E. Van Wirt, Andrew G. Aylies, and George F. Jones, Glens Falls, N. Y., assignors to Imperial Paper and Color Corporation, Glens Falls, N. Y., a corporation of New York Application February 23, 1937, Serial No. 127,184

9 Claims. (Cl. 134—58)

This invention relates to the drying of pigments, and particularly to the drying of pigments which are precipitated from aqueous solution or occur as a mixture of pigment particles and water at a stage in their process of manufacture. The invention is concerned primarily with the drying of aqueous mixtures of iron blues, i. e. iron ferrocyanide pigments such as Prussian Blue, Steel Blue, Milori Blue, Chinese Blue, Bronze Blue, etc., either alone or in combination with other pigments, such as the well-known mixture of iron blues with lead chromate called "Chrome Green".

Pigments which are precipitated from solutions, particularly aqueous solutions, are usually in the form of very fine particles, which in many cases require no further reduction in size to render them suitable for incorporation into printing inks, enamels, paints, lacquers and other coating compositions. When, however, the aqueous pigment pulp is subjected to drying, the pigments manifest an unfortunate tendency to cake and to form hard aggregates in which several pigment particles are bound together. When this occurs the dried pigments must be subjected to severe mechanical action by means of ball mills, roller mills or other types of grinders in order to break up the aggregates. Thus the iron blues, which have an extremely fine particle size as originally precipitated, form exceedingly hard and tenacious aggregates upon drying, and in heretofore customary practice have been subjected to an arduous grinding operation to break up aggregates.

As a result of our investigations we have discovered a method of removing water from wet pigment pulps which inhibits the formation of hard aggregates and leaves the dried pigment in a loosely consolidated condition. Marketable dry pigments of sufficient fineness for use in coating compositions can be prepared from the product of our process with only a fraction of the heretofore customary grinding.

In accordance with our invention an aqueous pigment pulp is prepared for drying by incorporating into it a softening agent in the form of a volatile liquid capable of inhibiting the formation of hard pigment agglomerates during drying and having a boiling point higher than that of water at the same pressure. The resulting mixture is subjected to heating to evaporate the water and the softening agent from the pigment. Because the boiling point of the softening agent is higher than that of water, the latter is driven off ahead of the former, so that the last liquid fraction in contact with the pigment during drying is substantially all softening agent. This permits the softening agent to operate at the crucial time without interference from the water.

The vapors of water and softening agent are collected and condensed. Thereafter the softening agent is separated from the water in the condensate and added again to the aqueous pigment pulp which is to be dried, thus establishing a cycle in the process.

Preferably the softening agent is separated from the condensate by a "salting out" process which involves adding to the condensate a substance (hereinafter called a separating agent) which is soluble in water and substantially insoluble in the softening agent. The addition of such a substance in sufficient quantity causes the condensate to separate into two substantially immiscible layers, one containing substantially all of the softening agent and the other comprising an aqueous solution of the separating agent (provided that the solution and the softening agent have different specific gravities). It is then relatively simple to separate the solution from the softening agent, for example by decantation.

After the softening agent has been removed, the separating agent may be recovered from the water which accompanies it and added again to the condensate.

The evaporation of the softening agent and water from the pigment should preferably be conducted under vacuum in order to lower the boiling points of both softening agent and water. Preferably the degree of vacuum should be sufficient to permit the removal of all liquid from the pigment without exceeding a temperature of about 100° C. Such practice minimizes the possibility of deleteriously affecting the pigments by heating them to an excessive temperature.

The softening agent employed should meet the following qualifications:

1. It must have the faculty of inhibiting the formation of hard agglomerates in the particular pigment undergoing drying in contact with it.

2. It must be relatively volatile, but must have a boiling point above that of water at the pressure under which evaporation is conducted so that the water will evaporate in advance of the softening agent. Moreover, the lower is the boiling point of a softening agent, the more difficult it is to condense and the greater will be the opportunity for loss of the softening agent as vapor from the condenser.

3. The softening agent should be such as to withstand repeated evaporation without substantial decomposition, i. e., stable.

4. It should be substantially chemically inert with respect to water, the pigment, and other materials in which it comes in contact in the operation of the process.

5. The pigment should be substantially insoluble in the softening agent.

6. The softening agent should be volatile (at the pressure at which evaporation is effected) at a temperature below that at which the pigment begins to decompose or to be otherwise deleteriously affected.

7. The softening agent should be easily and cheaply separable from water, but may be miscible with water.

From a practical standpoint, the following are desirable characteristics of the softening agent, because in practical operations a small amount of the softening agent may be left in the dried pigment through accident or design:

8. Pleasant odor.

9. Non-toxicity.

10. Compatibility with oils and other vehicles in which the dried pigment may be incorporated.

11. The softening agent should not decrease the "wetability" of dried pigments with the vehicles in which they are to be incorporated.

In the case of the iron blues, a softening agent which fulfills all of the foregoing qualifications is mono-butyl ether of ethylene glycol. This compound boils at a temperature in excess of the boiling point of water. Its boiling point at atmospheric pressure is about 165° C. However, under an easily attainable vacuum, corresponding to say 28 inches of mercury, the compound boils at a temperature below 100° C. Its elimination, therefore, does not involve high temperatures which might result in damage to the pigment. The mono-butyl ether of ethylene glycol is stable, water-miscible, chemically inert with respect to water and to the iron ferrocyanide pigments, and is easily separated from water either by fractionation or by decantation after adding a suitable separating agent. The iron ferrocyanide pigments are substantially insoluble in this compound, which moreover is harmless, has a pleasant odor, is soluble in most oils and water and does not affect adversely the wetability of pigments by vehicles. If, therefore, a small amount of the agent should be left upon the pigment in the drying operation, its presence would not have a harmful effect.

The homologues of mono-butyl ether of ethylene glycol which have a boiling point higher than 100° C. at atmospheric pressure may also be employed to advantage in the practice of our invention with the iron blues. Of the homologues the mono-methyl ether and the mono-ethyl ether of ethylene glycol have proved to be desirable, although neither are so satisfactory as their butyl homologue.

These and other features of our invention will be more completely understood in the light of the following detailed description of a presently preferred practice of the invention in removing water from an aqueous pulp of iron blue pigment, taken in conjunction with the accompanying single figure, which is a diagrammatic flow sheet of the preferred practice.

Referring now to the flow sheet, it will be seen that an aqueous pulp of iron blue pigment is derived from a pigment precipitation step and partially dewatered by a process such as filtration, settling or partial evaporation. During the dewatering operation, excess water is removed, but the pigment particles must remain quite wet to avoid the formation of hard aggregates.

The partially dewatered pulp of iron blue preferably contains about 70% by weight of water, which is the usual water content of a raw iron blue pulp that has been subjected to filter pressing. However, in some cases, the partially dewatered pulp may contain as much as 60% by weight of pigment or as little as 15%, depending upon the character of the pigment particles, the force exerted in filtration, etc.

It is possible, of course, to treat the raw pulp by the process of the invention without first partially dewatering it. However, in most instances it will be more simple and economical to first remove part of the water by filtration, settling or even by partial evaporation, providing that substantially none of the pigment particles become completely dry so as to be bound into aggregates.

The wet pulp of iron blue containing about 70% of water and 30% by weight of pigment is mixed with about 40% by weight of a softening agent, such as ethylene glycol mono-butyl ether. The mixture is then placed in a drier, preferably a vacuum evaporator provided with an internal agitator. It may be convenient to mix the wet pulp and the softening agent within the vacuum evaporator itself. After thorough mixing, heat is applied to the vacuum drier and the vapors of water and of the softening agent are driven off under vacuum. A relatively high degree of vacuum is desirable, so that a low temperature of evaporation (preferably below 100° C.) will result in freeing the pigment of all liquid. Thus, when employing the mono-butyl ether of ethylene glycol as a softening agent a vacuum corresponding to a manometer reading of 28 inches of mercury should be maintained, in which case the liquid will be removed from the pigment at a temperature substantially below 100° C.

As distillation proceeds the first fraction driven off will be relatively high in water and low in softening agent, while later portions will contain less water and more softening agent. Just before drying is completed the liquid remaining in contact with the pigment is almost entirely softening agent. The drying operation is continued under the vacuum until the pigment is substantially dried.

The dried pigment resulting from this operation is soft and relatively unconsolidated. It is withdrawn from the drier and subjected to further processing, if desired. A relatively slight grinding operation will render the dried pigment sufficiently fine for use in practically all coating compositions.

The vapors of water and of softening agent driven off from the vacuum drier are sucked out of the drier by means of a vacuum pump and condensed by cooling. The condenser may be of any of the conventional types in which liquid employed for cooling does not become mixed with the condensate. A satisfactory form is a simple cooling coil immersed in a bath through which cold water is circulated, the condensation taking place within the coil. Preferably the condenser is disposed between the vacuum drier and the vacuum pump so as to minimize the load upon the latter. It is possible, however, to place the condenser in the system following the vacuum pump, in which case the vapors pass through the vacuum pump and are later condensed.

The condensate is a clear homogeneous liquid because the softening agent and the water are mutually soluble, i. e. miscible with each other.

It is possible to separate the softening agent from the water by fractionation, i. e. by fractional distillation, fractional condensation or by the use of a rectifying column. However, we have found that a much simpler and wholly satisfactory separation of the softening agent from the water may be achieved by adding to the condensate a separating agent in the form of a substance which is soluble in water but substantially insoluble in the softening agent. Thus, in the case of a condensate containing mono-butyl ether of ethylene glycol and water, separation is achieved by adding thereto sodium sulfate, preferably in the anhydrous form and in amount sufficient to saturate the water. If anhydrous sodium sulfate is thoroughly incorporated into the condensate and thereafter the condensate is permitted to become quiescent, the condensate will separate into two substantially immiscible layers. The upper layer contains about 90% of the softening agent and about 10% water substantially free from sodium sulfate. The lower layer is a saturated aqueous solution of sodium sulfate substantially free of the softening agent. The two layers are separated from each other by simple decantation as shown on the flow sheet.

Other stable salts which are soluble in water and substantially insoluble in the softening agent may be used instead of sodium sulfate.

The decanted upper layer consisting principally of softening agent is returned and used over again by mixing it with the pigment pulp prior to drying.

The separating agent, such as sodium sulfate, is recovered very simply by subjecting the decanted lower layer to boiling, whereupon the water is evaporated and the sodium sulfate is made available for re-use and is returned to be mixed with the condensate. The boiling may be conducted at atmospheric pressure.

To hasten or promote the drying of the pulp a tertiary liquid, such as alcohol, benzene, or other substance having a lower boiling point than the softening agent, may be added to the pulp together with the softening agent prior to drying. Preferably the tertiary liquid is insoluble in the softening agent, thereby facilitating subsequent separation of the softening agent from the condensate.

By recovering the softening agent or the separating agent or both as described hereinbefore and using them over again in a cyclic manner, the process of the invention may be conducted in an economical manner and with relatively small loss of the agents.

We claim:

1. In a process for removing water from wet iron ferrocyanide pigment, the improvement which comprises incorporating in the wet pigment a liquid selected from the group consisting of mono-butyl ether of ethylene glycol and its water-miscible homologues having a boiling point higher than water, and removing water and at least a portion of said liquid from the wet pigment by evaporation.

2. A process for removing water from wet pigment which comprises incorporating in the wet pigment a liquid selected from the group consisting of mono-butyl ether of ethylene glycol and its water-miscible homologues having a boiling point higher than water and removing water and at least a portion of said liquid from the wet pigment by evaporation.

3. A cyclic process for removing water from iron ferro-cyanide pigments and inhibiting caking thereof which comprises incorporating in a mixture of the pigment and water an organic liquid of the group consisting of mono-butyl ether of ethylene glycol and its water-miscible homologues having a boiling point higher than water, heating the resulting mixture to drive off vapor containing water and the organic liquid, condensing the vapor, physically separating the organic liquid from the resulting condensate, and incorporating the separated organic liquid in the mixture of pigment and water so that it is utilized again.

4. A cyclic process for removing water from wet pigment which comprises incorporating in the wet pigment a liquid selected from the group consisting of mono-butyl ether of ethylene glycol and its water-soluble homologues having a boiling point higher than water, subjecting the resulting mixture to evaporation to remove water and at least a portion of said liquid from the pigment as a vapor, condensing the vapor, adding a salt that is soluble in water and substantially insoluble in the liquid to the resulting condensate to cause the water and the liquid to become substantially immiscible, thereafter separating the liquid from the water and the salt and returning the liquid to the pigment to be utilized again.

5. A cyclic process for removing water from pigment and inhibiting caking thereof which comprises incorporating in a mixture of the pigment and water an organic substance of the group consisting of the mono-butyl ether of ethylene glycol and its water-miscible homologues having a boiling point higher than water, heating the resulting mixture to drive off vapor containing water and the organic substance, condensing the vapor, adding to the resulting condensate a salt that is water soluble but substantially insoluble in the organic substance to cause the water and the organic substance to separate into substantially immiscible layers, thereafter separating the water and the organic substance by decantation, returning the organic substance for use again in a mixture of the pigment and water, removing the separating agent from the water, and returning the separating agent to the condensate to cause its contents of water and of the organic substance to become immiscible.

6. A process for removing water from iron ferro-cyanide pigments which comprises incorporating mono-butyl ether of ethylene glycol in a mixture of the pigment and water, and subjecting the resulting mixture to drying to evaporate the water and the mono-butyl ether of ethylene glycol.

7. A process for removing water from iron ferro-cyanide pigments which comprises incorporating normal ethyl ether of ethylene glycol in a mixture of the pigment and water and subjecting the resulting mixture to drying to evaporate the water and the normal ethyl ether of ethylene glycol.

8. A process for removing water from iron ferro-cyanide pigments which comprises incorporating in a mixture of the pigment and water mono-methyl ether of ethylene glycol and subjecting the resulting mixture to drying to evaporate the water and the mono-methyl ether of ethylene glycol.

9. A cyclic process for removing water from aqueous pigment which comprises incorporating in the aqueous pigment a relatively volatile organic water-miscible liquid that inhibits caking of the pigment during drying, has a boiling point higher than water, is chemically inert with respect to water and the pigment, will withstand repeated evaporation without decomposition, and in which the pigment is substantially insoluble, subjecting the resulting mixture to evaporation to drive off water and the organic liquid as a vapor, condensing the vapor, adding to the resulting condensate an anhydrous salt which is water-soluble but substantially insoluble in the organic liquid thus forming, an aqueous salt solution which is immiscible with and of different density than the organic liquid, separating the organic liquid from the salt solution by decantation and returning the organic liquid to the aqueous pigment thereby utilizing the organic liquid again.

ALFRED E. VAN WIRT.
ANDREW G. AYLIES.
GEORGE F. JONES.